United States Patent
Zhu et al.

(10) Patent No.: US 9,656,206 B2
(45) Date of Patent: May 23, 2017

(54) COMBINED DESULFURATION, DENITRATION, AND DEMERCURATION APPARATUS AND METHOD USING SEMI-DRY PROCESS IN CIRCULATING FLUIDIZED BED

(71) Applicants: INSTITUTE OF PROCESS ENGINEERING, CHINESE ACADEMY OF SCIENCES, Beijing (CN); BEIJING ZSTC ENVIRONMENTAL ENGINEERING CO., LTD., Beijing (CN)

(72) Inventors: Tingyu Zhu, Beijing (CN); Wenqing Xu, Beijing (CN); Meng Ye, Beijing (CN); Ruizhuang Zhao, Beijing (CN)

(73) Assignees: INSTITUTE OF PROCESS ENGINEERING, CHINESE ACADEMY OF SCIENCES, Beijing (CN); BEIJING ZSTC ENVIRONMENTAL ENGINEERING CO., LTD., Beijing (CN)

(*) Notice: Subject to any disclaimer, the term of this patent is extended or adjusted under 35 U.S.C. 154(b) by 16 days.

(21) Appl. No.: 14/892,150

(22) PCT Filed: Oct. 23, 2013

(86) PCT No.: PCT/CN2013/085773
§ 371 (c)(1),
(2) Date: Nov. 18, 2015

(87) PCT Pub. No.: WO2015/054929
PCT Pub. Date: Apr. 23, 2015

(65) Prior Publication Data
US 2016/0089631 A1 Mar. 31, 2016

(30) Foreign Application Priority Data

Oct. 15, 2013 (CN) .......................... 2013 1 0482358

(51) Int. Cl.
*B01J 8/18* (2006.01)
*B01J 8/24* (2006.01)
(Continued)

(52) U.S. Cl.
CPC ............ *B01D 53/83* (2013.01); *B01D 53/346* (2013.01); *B01D 53/56* (2013.01); *B01D 53/60* (2013.01);
(Continued)

(58) Field of Classification Search
CPC .... B01J 8/18; B01J 8/24; B01D 53/12; B01D 53/501; B01D 53/565; B01D 53/60; B01D 53/64; B01D 53/83
See application file for complete search history.

(56) References Cited

U.S. PATENT DOCUMENTS 6,685,902 B2 * 2/2004 Morin ................. B01D 53/508
423/244.01
7,303,735 B2 * 12/2007 Suchak ................. B01D 53/50
423/210
(Continued)

FOREIGN PATENT DOCUMENTS

CN  1923337 A  3/2007
CN  1923341 A  3/2007
(Continued)

OTHER PUBLICATIONS

Abstract of CN 1923337 A, Mar. 2007.
(Continued)

*Primary Examiner* — Timothy Vanoy
(74) *Attorney, Agent, or Firm* — McDonald Hopkins LLC

(57) ABSTRACT

A combined desulfuration, denitration, and demercuration apparatus and method using a semi-dry process in a circulating fluidized bed. The apparatus comprises a flue (2) and a circulating fluidized bed reaction column (8) connected in (Continued)

sequence, the flue (2) being connected to a bottom inlet of the circulating fluidized bed reaction column (8). The flue (2) is further connected to an ozone generation apparatus (1). The ozone distributor (1) feeds ozone in the flue (2) and sends oxidized flue gas into the circulating fluidized bed reaction column (8), so that the $SO_2$, high-valence $NO_x$, and $Hg^{2+}$ contained in the flue gas are removed through reactions with a Ca-based absorbent under the effect of atomized water in the reaction column (8).

16 Claims, 1 Drawing Sheet

(51) Int. Cl.

| | |
|---|---|
| B01D 53/12 | (2006.01) |
| B01D 53/50 | (2006.01) |
| B01D 53/60 | (2006.01) |
| B01D 53/64 | (2006.01) |
| B01D 53/83 | (2006.01) |
| B01D 53/56 | (2006.01) |
| B01D 53/34 | (2006.01) |
| B01D 53/96 | (2006.01) |
| B01D 53/80 | (2006.01) |
| B01D 53/76 | (2006.01) |

(52) U.S. Cl.
CPC ............ *B01D 53/64* (2013.01); *B01D 53/96* (2013.01); *B01D 53/504* (2013.01); *B01D 53/76* (2013.01); *B01D 53/80* (2013.01); *B01D 2251/104* (2013.01); *B01D 2251/404* (2013.01); *B01D 2257/302* (2013.01); *B01D 2257/404* (2013.01); *B01D 2257/602* (2013.01); *B01D 2258/0291* (2013.01)

(56) References Cited

U.S. PATENT DOCUMENTS

| 2003/0143140 A1* | 7/2003 | Hwang | ................ B01D 53/501 |
| | | | 423/210 |
| 2004/0109800 A1* | 6/2004 | Pahlman | ............ B01D 53/0454 |
| | | | 423/210 |
| 2016/0082389 A1* | 3/2016 | Suchak | .................. B01D 53/75 |
| | | | 423/239.1 |

FOREIGN PATENT DOCUMENTS

| CN | 1962034 A | 5/2007 |
| CN | 201214045 Y | 4/2009 |
| CN | 102228788 A | 11/2011 |
| CN | 102366704 A | 3/2012 |
| CN | 203436995 U | 2/2014 |
| CN | 203447967 U | 2/2014 |
| WO | 2009/043108 A1 | 4/2009 |

OTHER PUBLICATIONS

Abstract of CN 1962034 A, May 2007.
Abstract of CN 102228788 A, Nov. 2011.
Abstract of CN 102366704 A, Mar. 2002.
Abstract of CN 201214045 Y, Apr. 2009.
Abstract of CN 203436995 U, Feb. 2014.
Abstract of CN 203447967 U, Feb. 2014.
Hu Jin-bang et.al, "Effect of the Venturi Inlet Configuration on Flow Character in Circulating Fluidized Bed Desulfurization Reactor," Journal of Tianjin University, Mar. 31, 2005, vol. 38, No. 3, Tianjin, China.
State Intellectual Property Office of People's Republic of China, First Office Action for Patent Application No. 201310482358.8, dated Feb. 10, 2015.
State Intellectual Property Office of People's Republic of China, Second Office Action for Patent Application No. 201310482358.8, dated Jul. 10, 2015.
ISA / CN, International Search Report and Written Opinion, prepared for PCT/CN2013/0854773, dated Jul. 9, 2014.

* cited by examiner

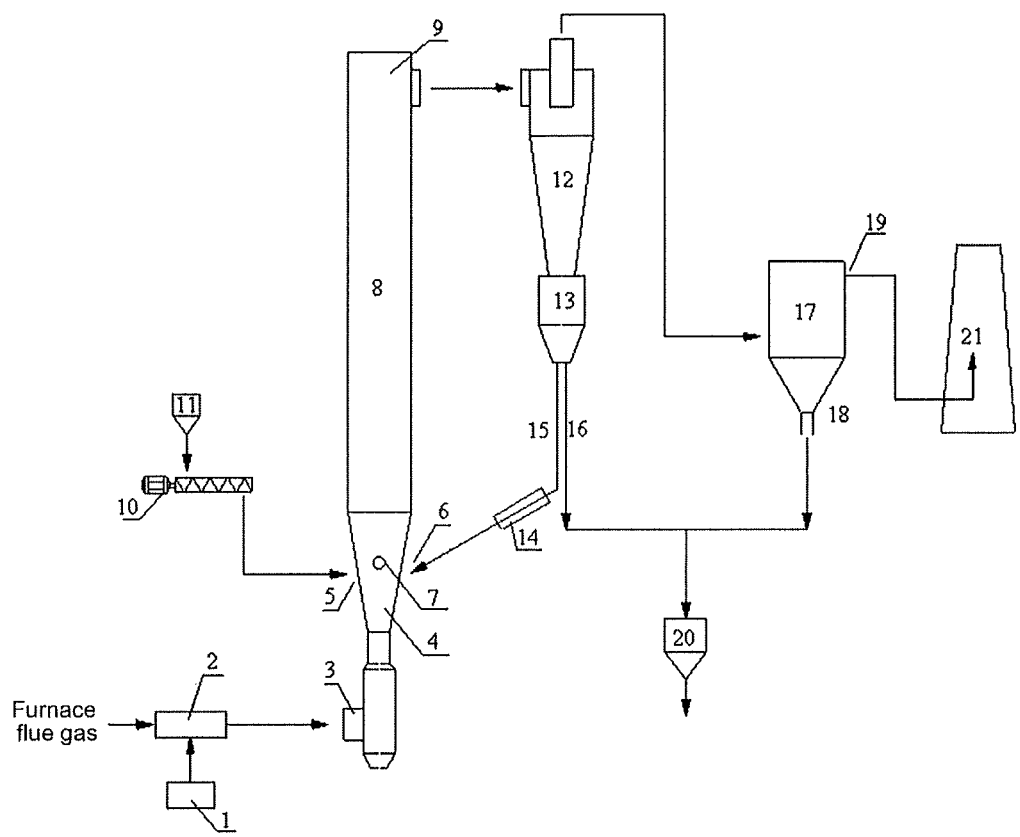

COMBINED DESULFURATION, DENITRATION, AND DEMERCURATION APPARATUS AND METHOD USING SEMI-DRY PROCESS IN CIRCULATING FLUIDIZED BED

CROSS-REFERENCE TO RELATED APPLICATION

This application is a 35 U.S.C. 371 national stage filing of PCT Application No. PCT/CN2013/085773, filed on Oct. 23, 2013, which claims the benefit of Chinese Patent Application No. 201310482358.8, filed on Oct. 15, 2013, both of which are incorporated herein in their entirety by reference.

TECHNICAL FIELD

The present invention belongs to the field of flue gas purification, specifically relates to a combined desulfuration, denitration, and demercuration apparatus and a method using semi-dry process in circulating fluidized bed.

BACKGROUND ART

The flue gas of coal-fired industrial furnace has an emission characteristic that various pollutants such as $SO_2$, $NO_x$ and Hg etc. coexist therein. In the current flue gas control technology for coal-fired industrial furnace, desulfuration, denitration and demercuration are often performed in multiple independent systems. The grading treatment requires not only a large space, a complex system, but also high costs of equipment investment and operation. Thus, a development of combined control technology of various pollutants is needed urgently.

The existing treatment techniques for furnace flue gas are as follows:

(1) Combined desulfuration, denitration, and demercuration with wet process in reaction tower. CN101306322A and CN101310836A disclose an integrated coordinated desulfuration, denitration and demercuration apparatus and a process of using spray bubbling method and preparation of absorption liquid, and the technical solution thereof is that: flue gas is bubbled through the absorption slurry in the absorption tower after being distributed by bubbling jet pipe, and the purpose of removing various pollutants simultaneously is achieved by gas-liquid contact; and the main component of absorption liquid is limestone slurry into which a strong oxidizing agent is added. CN101310834A discloses a method of using gas-liquid contact grading oxidation for desulfuration, denitration and demercuration process, and the technical solution thereof is that: first stage of desulfuration is carried out using lime/limestone-gypsum by wet process, and the residuals of $SO_2$, $NO_x$ and Hg are dissolved by oxidation using an aqueous solution of oxidizing agent by gas-liquid contact to achieve second stage of desulfuration, denitration/demercuration. CN102091517A notes that an integrated absorption liquid for simultaneous desulfuration, denitration and demercuration and preparation method and use thereof, and its technical solution is that: $SO_2$, $NO_x$ and Hg in the flue gas are washed and thus removed using mixed absorption liquid of nitrogen-containing reducer and additives by utilizing existing wet desulfuration facilities and improving existing alkalic desulfuration absorption liquid. CN102078761A proposes a comprehensive flue gas desulfuration, demercuration and denitration process and apparatus, and the technical solution thereof is that: flue gas first enters into ammonia reactor and reacts with ejected ammonia liquid, to remove partial nitrogen oxides, mercury and sulfur oxides, then enters into absorption tower and reacts again, to absorb residual sulfur oxides and heavy metal mercury by use of dedusting ash and alkaline liquid, and this achieves a combined removal of various pollutants. CN1923337A discloses an apparatus for removing various pollutants in flue gas simultaneously by ozone oxidation and method thereof, and its technical solution is: spraying ozone into furnace flue zone, feeding the ozone-treated furnace flue gas into lye washing tower for washing and absorbing sulfur oxides, nitrogen oxides, mercury and other substances, and adding $H_2S$ and other substances into the reservoir to stabilize mercury. All the above combined removals using wet process have problems that: they need a pulping system, the systems are complex; mercury which is in oxidation state has a secondary release in the wet desulfuration tower, etc.

(2) Combined desulfuration, denitration, and demercuration with dry process in reaction tower. CN1962034A discloses a method and apparatus for desulfuration, denitration and demercuration from furnace flue gas simultaneously, and its technical solution is: spraying an oxygen-enriched high activity absorbent which is consisted of fly ash, slaked lime and additives into a circulating fluidized bed reactor to remove various pollutants of $SO_2$, $NO_x$, Hg and others simultaneously. CN102500226A proposes an integrated apparatus and method for dry desulfuration, denitration and demercuration from flue gas, and its technical solution is that: an absorbent, an oxidizing additive and circulating ashes are added into a slaking humidifier to form a mixed ash, which is then sprayed into a reaction tower; $SO_2$, $NO_x$ and Hg in flue gas are reacted with and adsorbed by corresponding substances and thus the flue gas is purified. The above dry combined removals use the method of adding liquid-phase, solid-phase oxidants into reaction system. Since they are gas-liquid, gas-solid heterogeneous reactions, there are problems of low contact reaction efficiency and a need for newly added complex spraying system, etc.

(3) Combined desulfuration, denitration, and demercuration in reaction tower based on induction technology. CN101337153A discloses an ultrasonic integrated desulfuration, denitration and demercuration method and apparatus, and its technical solution is: reacting strong oxidizing hydroxyl radicals released when ultrasonic cavitation was produced in reaction solution by ultrasonic with $SO_2$, $NO_x$ and Hg in flue gas in a bubbling bed reactor to achieve the purpose of removal. CN102614776A proposes an apparatus and a method of desulfuration, denitration and demercuration combined with microwave induced catalysis, and its technical solution is that: flue gas passes through each reaction chamber inside the reactor which uses single-mode microwave source as heat source, and $SO_2$, $NO_x$ and Hg in flue gas occurs oxidation-reduction reaction under the effect of catalyst and thereby generates inert substances or substances that can be easily removed, and thus a combined removal of $SO_2$, $NO_x$ and Hg is achieved. The above combined removals based on induction technology employ methods for producing active free radicals, such as by high voltage discharge, etc., and there are problems of high cost and instability.

(4) Combined desulfuration, denitration, and demercuration based on catalytic oxidation. CN102527205A proposes a method and system for flue gas desulfuration, denitration, and demercuration based on catalytic oxidation simultaneously, and its technical solution is that: a catalytic reactor is arranged in a flue positioned in front of absorber; NO and $Hg^0$ react with $O_2$ in the flue gas and thereby generate $NO_2$ and $Hg^{2+}$ under the effect of the catalyst in the catalytic reactor; the oxidized flue gas feeds into an absorber containing absorption liquid and then the purpose of absorption of $SO_2$, $NO_2$ and $Hg^{2+}$ is achieved simultaneously. The above combined removal based on catalytic oxidation method has a problem of low hydrothermal stability of the catalyst, and is easy to reduce efficiency by sulfur poisoning, etc.

For the combined removal of various pollutants in coal-fired furnace flue gas, the circulating fluidized bed semi-dry removal technology has advantages of owning shorter process flow, covering less area, good economy and high efficiency, etc., and is widely suitable for various reconstruction projects of our country with small venues. It is cost saving and gets great concern by related industries or enterprises. From a technical perspective, flue gas desulfuration technology using semi-dry process in circulating fluidized bed has been quite mature, and based on this, it is a domestic and international development trend to develop combined desulfuration, denitration and demercuration technology to achieve combined removal of various pollutants in flue gas and achieve upgrade of technology.

CONTENTS OF THE INVENTION

The objectives of the present invention lie in providing a combined desulfuration, denitration, and demercuration apparatus and method using semi-dry process in circulating fluidized bed, aiming at addressing the deficiencies of existing techniques.

In order to achieve this objective, the present invention employs the following technical solutions:

One of the objectives of the present invention lies in providing a combined desulfuration, denitration, and demercuration apparatus using semi-dry process in circulating fluidized bed. Described apparatus comprises a flue and a circulating fluidized bed reaction column connected in sequence, the flue being connected to a bottom inlet of the circulating fluidized bed reaction column; the flue is further connected to an ozone generation apparatus.

Furnace flue gas to be treated enters the flue, and then is oxidized by ozone generated by the ozone generation apparatus. In the flue, NO and $Hg^0$ in the flue gas are oxidized to high-valence $NO_x$ and $Hg^{2+}$. The oxidized flue gas enters the circulating fluidized bed reaction column through the bottom inlet thereof, and $SO_2$, high-valence $NO_x$ and $Hg^{2+}$ in the flue gas are removed through reactions with a Ca-based absorbent under the effect of atomized water.

An upper outlet of the circulating fluidized bed reaction column is connected to a cyclone separator, and a first outlet of separation hopper of the cyclone separator is connected to a recycled material inlet of the circulating fluidized bed reaction column. The role of the cyclone separator is to feed the Ca-based absorbent having been reacted and then separated from flue gas back to the circulating fluidized bed reaction column through the recycled material inlet in order to make the Ca-based absorbent continue to participate in the reaction. The upper outlet of the circulating fluidized bed reaction column is connected in tangential direction to the cyclone separator. The expression "connected in tangential direction" means that the inlet of cyclone separator has a tangential structure.

The first outlet of separation hopper of the cyclone separator is connected to the recycled material inlet of the circulating fluidized bed reaction column through an air chute.

The cyclone separator is connected to a deduster, and a second outlet of separation hopper of the cyclone separator is communicated with the separation hopper of the deduster and an ash bin simultaneously. The deduster discharges flue gas into atmosphere after further removing dust in the flue gas. A purged gas outlet of the deduster is connected to a chimney.

An ozone distributor is arranged at the connecting position of the ozone generation apparatus and the flue. The ozone distributor is capable of making ozone produced by the ozone generation apparatus be distributed uniformly in the flue, maximizing oxidation efficiency and minimizing loss of ozone.

The bottom of the circulating fluidized bed reaction column has a Venturi structure. A feed inlet, a recycled material inlet and a water spray nozzle are arranged in Venturi expansion section, and the spray nozzle is mounted along the downstream direction of the flue gas.

An absorbent warehouse is connected to feed inlet through a screw conveyor.

Another objective of the present invention is to provide a method for removing various pollutants by the above-mentioned combined desulfuration, denitration, and demercuration apparatus using semi-dry process in circulating fluidized bed, comprising steps of:

1) Spraying ozone into the flue, so that NO and $Hg^0$ in the flue gas are oxidized to high-valence $NO_x$ and $Hg^{2+}$ in the flue; and
2) The oxidized flue gas is transferred to the circulating fluidized bed reaction column, so that the $SO_2$, high-valence $NO_x$ and $Hg^{2+}$ contained in the flue gas are removed through reactions with a Ca-based absorbent under the effect of atomized water in the reaction column.

The high-valence $NO_x$ in the present invention mainly refers to $NO_2$ and $N_2O_5$, and the proportion of the two mainly depends on the amount of ozone sprayed into the flue.

The Ca-based absorbent having been reacted returns to the circulating fluidized bed reaction column through air chute after being separated by the cyclone separator to achieve multiple cycles, and the flue gas is discharged into atmosphere after the dust therein is further removed by deduster.

In step 1), the molar ratio of ozone sprayed into the flue to nitrogen oxide in the flue gas is controlled in the range of 0.5-2.5, for example 0.51-2.49, 0.7-2.23, 0.86-2.1, 0.99-1.97, 1.2-1.75, 1.35-1.5 etc. The reaction time is preferably not less than 0.5 seconds, for example, it can be selected as 0.6 seconds, 1.5 seconds, 3 seconds, 5 seconds, 10 seconds etc.

In step 2), the Ca-based absorbent is added in a ratio that makes the molar ratio of Ca/(S+N) be 1.1-2.0, which can be selected as 1.11-1.96, 1.3-1.8, 1.42-1.67, 1.53, etc.

The present invention can control the contents of sulfur oxides, nitrogen oxides and mercury in the treated flue gas by adjusting the addition amount of Ca-based absorbent; adjust the amount of sprayed water according to the flue gas temperature at the outlet of the circulating fluidized bed reaction column to ensure the temperature in the column is kept above the dew point of the flue gas; control the differential pressure between the inlet and outlet of the circulating fluidized bed reaction column by adjusting the amount of the recycled material.

The present invention has the following beneficial effects compared to the prior art:

1) The system is simple, with small space and low investment and operating costs.
2) NO and $Hg^0$ which are not easily absorbed by absorbents are oxidized to high-valence $NO_x$ and $Hg^{2+}$ in the flue under the effect of ozone, and the high-valence $NO_x$ and $Hg^{2+}$ can be reacted together with sulfur oxides during a subsequent circulating fluidized bed semi-dry removal process, without a need for separate denitration and demercuration apparatus.
3) The outlet of the reaction column is connected in tangential direction to the cyclone separator, which achieves the recycle of the absorbent outside the reaction column and thus improves utilization efficiency of the absorbent.
4) The present invention has a high removal efficiency to $SO_2$, NO and $Hg^0$. The desulfuration efficiency using semi-dry process in circulating fluidized bed can be more than 95%; NO and $Hg^0$ in flue gas contact with $O_3$ and are oxidized quickly; under certain technological conditions, the denitration efficiency can be more than 70%, and the demercuration efficiency can be more than 90%.

DESCRIPTION OF FIGURES

FIG. 1 is a process flow chart of the present invention. The following identifies the reference numbers in FIG. 1 to the name of that feature: 1—ozone generation apparatus; 2—flue; 3—bottom inlet of circulating fluidized bed reaction column; 4—Venturi expansion section; 5—feed inlet; 6—recycled material inlet; 7—water spray nozzle; 8—circulating fluidized bed reaction column; 9—upper outlet of circulating fluidized bed reaction column; 10—screw conveyor; 11—absorbent warehouse; 12—cyclone separator; 13—separation hopper of cyclone separator; 14—air chute; 15—first outlet; 16—second outlet; 17—deduster; 18—separation hopper of deduster; 19—purged gas outlet; 20—ash bin; and 21—chimney.

Hereinafter, the present invention will be described in more detail. However, the following examples are merely simple examples of the present invention and do not represent or limit the scope claimed by the present invention, and the scope of the present invention is set out by the claim set.

EMBODIMENTS

Hereinafter, the technical solutions of the present application are further described by the specific embodiments combined with the FIGURE.

In order to illustrate the present invention better and to facilitate understanding the technical solutions of the present application, typical but non-limiting examples of the present invention are as follows:

Example 1

A combined desulfuration, denitration, and demercuration apparatus using semi-dry process in circulating fluidized bed, comprising a flue 2 and a circulating fluidized bed reaction column 8 connected in sequence, the flue 2 being connected to a bottom inlet 3 of the circulating fluidized bed reaction column; the flue 2 is further connected to an ozone generation apparatus 1.

A method for removing various pollutants by the above combined desulfuration, denitration, and demercuration apparatus using semi-dry process in circulating fluidized bed, comprising steps of:

1) Spraying ozone into the flue 2, so that NO and $Hg^0$ in the flue gas are oxidized to high-valence $NO_x$ and $Hg^{2+}$ in the flue; and
2) The oxidized flue gas is transferred to the circulating fluidized bed reaction column 8, so that the $SO_2$, high-valence $NO_x$ and $Hg^{2+}$ contained in the flue gas are removed through reactions with a Ca-based absorbent under the effect of atomized water in the reaction column.

In step 1), the molar ratio of ozone sprayed into the flue to nitrogen oxide in the flue gas is controlled to be 0.5; the reaction time is not less than 0.5 seconds. In step 2), the Ca-based absorbent is added in a ratio that makes the molar ratio of Ca/(S+N) be 1.1.

The contents of sulfur oxides, nitrogen oxides, and mercury in the treated flue gas are controlled by adjusting the addition amount of Ca-based absorbent. The amount of sprayed water is adjusted according to the flue gas temperature at the outlet of the circulating fluidized bed reaction column 8 to ensure the temperature in the column is kept above the dew point of the flue gas. The differential pressure between the inlet and outlet of the circulating fluidized bed reaction column 8 is controlled by adjusting the amount of the recycled material.

Example 2

A combined desulfuration, denitration, and demercuration apparatus using semi-dry process in circulating fluidized bed, comprising a flue 2, a circulating fluidized bed reaction column 8, a cyclone separator 12 and a deduster 17 connected in sequence, the flue 2 being connected to a bottom inlet 3 of the circulating fluidized bed reaction column; the flue 2 is further connected to an ozone generation apparatus 1. An ozone distributor is arranged between the ozone generation apparatus 1 and the flue 2.

An upper outlet 9 of the circulating fluidized bed reaction column is connected in tangential direction to the cyclone separator 12. A first outlet 15 of separation hopper 13 of the cyclone separator is connected to a recycled material inlet 6 of the circulating fluidized bed reaction column through an air chute 14.

The cyclone separator 12 is connected to the deduster 17, and a second outlet 16 of separation hopper 13 of the cyclone separator is communicated with the separation hopper 18 of the deduster and an ash bin 20 simultaneously. A purged gas outlet 19 of the deduster 17 is connected to a chimney 21.

The bottom of the circulating fluidized bed reaction column 8 has a Venturi structure. A feed inlet 5, a recycled material inlet 6 and a water spray nozzle 7 are arranged in Venturi expansion section 4, and the water spray nozzle 7 is mounted along the downstream direction of the flue gas. An absorbent warehouse 11 is connected to the feed inlet 5 through a screw conveyor 10.

A method for removing various pollutants by the above combined desulfuration, denitration, and demercuration apparatus using semi-dry process in circulating fluidized bed, comprising steps of:

1) Ozone is sprayed into the flue 2, so that NO and $Hg^0$ in the flue gas are oxidized to high-valence $NO_x$ and $Hg^{2+}$ in the flue;
2) The oxidized flue gas is transferred to the circulating fluidized bed reaction column 8, so that the $SO_2$, high-valence $NO_x$ and $Hg^{2+}$ contained in the flue gas are removed through reactions with a Ca-based absorbent under the effect of atomized water in the reaction column; and 3) The Ca-based absorbent having been reacted returns to the reaction column through the air chute 14 after being separated by the cyclone separator 12 to achieve multiple cycles, and the flue gas is discharged into atmosphere after the dust therein is further removed by the deduster 17.

In step 1), the molar ratio of ozone sprayed into the flue to nitrogen oxide in the flue gas is controlled to be 2.5; the reaction time is not less than 0.5 seconds. In step 2), the Ca-based absorbent is added in a ratio that makes the molar ratio of Ca/(S+N) be 2.0.

The contents of sulfur oxides, nitrogen oxides, and mercury in the treated flue gas are controlled by adjusting the addition amount of Ca-based absorbent. The amount of sprayed water is adjusted according to the flue gas temperature at the outlet of the circulating fluidized bed reaction column 8 to ensure the temperature in the column is kept above the dew point of the flue gas. The differential pressure between the inlet and outlet of the circulating fluidized bed reaction column 8 is controlled by adjusting the amount of the recycled material.

The above examples give description on detailed structural characteristics and pollutants removal method of the present invention, but the invention is not limited to the above detailed structural characteristics and pollutants removal method, that is to say, it does not mean that the present invention must rely on the above detailed structural characteristics and pollutants removal method to be implemented. Those skilled in the art to which the present invention belongs should appreciate that any improvement to the present invention, equivalent replacement to the selected components of the present invention and added auxiliary components, and choice of specific embodiments will fall into the scope protected and disclosed by the present invention.

The above description describes the preferred embodiments of the present invention in detail; however, the present invention is not limited to the specific details in the above embodiments. Simple variants of the technical solutions of the present invention can be made within the scope of the technical conception of the present invention, and these simple variants all fall into the scope of the present invention.

It also needs to be noted that each specific technical feature described in the above embodiments can be combined in any suitable manner in the case of non-contradiction. In order to avoid unnecessary repetition, the present invention does not make further description for various possible combinations.

In addition, any combination of the various embodiments of the present invention can also be made and should be deemed as a disclosure of the present invention, as long as it is not contrary to the thought of the invention.

The invention claimed is:

1. A combined desulfuration, denitration, and demercuration apparatus using semi-dry process in circulating fluidized bed, comprising a flue and a circulating fluidized bed reaction column connected in sequence, the flue being connected to a bottom inlet of the circulating fluidized bed reaction column; the flue is further connected to an ozone generation apparatus.

2. The apparatus according to claim 1, further comprising an upper outlet on the circulating fluidized bed reaction column connected to a cyclone separator, and a first outlet of a separation hopper of the cyclone separator connected to a recycled material inlet of the circulating fluidized bed reaction column.

3. The apparatus according to claim 2, wherein the upper outlet of the circulating fluidized bed reaction column is connected in tangential direction to the cyclone separator.

4. The apparatus according to claim 2, wherein the first outlet is connected to the recycled material inlet through an air chute.

5. The apparatus according to claim 2, wherein the cyclone separator is connected to a deduster, and a second outlet of the separation hopper is communicated with a separation hopper of the deduster and an ash bin simultaneously.

6. The apparatus according to claim 5, further comprising a purged gas outlet of the deduster is connected to a chimney.

7. The apparatus according to claim 1, further comprising an ozone distributor arranged at the connecting position of the ozone generation apparatus and the flue.

8. The apparatus according to claim 2, wherein the bottom of the circulating fluidized bed reaction column has a Venturi structure, a feed inlet, a recycled material inlet and a water spray nozzle are arranged in a Venturi expansion section of the Venturi structure; and the water spray nozzle is mounted along the downstream direction of where the flue gas would travel.

9. The apparatus according to claim 8, further comprising an absorbent warehouse connected to the feed inlet through a screw conveyor.

10. A method for removing various pollutants by the combined desulfuration, denitration, and demercuration apparatus using semi-dry process in circulating fluidized bed comprising the steps of:
   1) Spraying ozone into a flue comprising flue gas, so that NO and $Hg^0$ in the flue gas are oxidized to high-valence $NO_x$ and $Hg^{2+}$ in the flue; and
   2) The oxidized flue gas is transferred to a circulating fluidized bed reaction column, so that the $SO_2$, high-valence $NO_x$ and $Hg^{2+}$ contained in the flue gas are removed through reactions with a Ca-based absorbent under the effect of atomized water in the reaction column.

11. The method according to claim 10, further comprising the reacted Ca-based absorbent returns to the reaction column through an air chute after being separated by a cyclone separator to achieve multiple cycles, and the flue gas is discharged after dust is removed by a deduster.

12. The method according to claim 10, further comprising that, in step 1), the molar ratio of ozone sprayed into the flue to nitrogen oxide in the flue gas is 0.5-2.5 and the reaction time is not less than 0.5 seconds.

13. The method according to claim 10, further comprising that, in step 2), the Ca-based absorbent is added in a ratio that makes the molar ratio of Ca/(S+N) to be 1.1-2.0.

14. The method according to claim 10, further comprising the contents of sulfur oxides, nitrogen oxides, and mercury in the treated flue gas are controlled by adjusting the addition amount of the Ca-based absorbent.

15. The method according to claim 10, further comprising the amount of water is adjusted according to the flue gas temperature at the outlet of a circulating fluidized bed reaction column to ensure the temperature in the column is kept above the dew point of the flue gas.

16. The method according to claim 10, further comprising that a differential pressure between the inlet and outlet of the circulating fluidized bed reaction column is controlled by adjusting the amount of the recycled material.

* * * * *